United States Patent [19]

Mitchell et al.

[11] 4,215,402
[45] Jul. 29, 1980

[54] HASH INDEX TABLE HASH GENERATOR APPARATUS

[75] Inventors: Glen R. Mitchell, Pine Island; Merle E. Houdek, Rochester, both of Minn.

[73] Assignee: International Business Machines Corporation, Rochester, Minn.

[21] Appl. No.: 953,675

[22] Filed: Oct. 23, 1978

[51] Int. Cl.² ............................ G06F 9/20; G06F 13/00
[52] U.S. Cl. .................................................... 364/200
[58] Field of Search ................................ 364/200, 900

[56] References Cited
U.S. PATENT DOCUMENTS

| | | | |
|---|---|---|---|
| 3,781,808 | 12/1973 | Ahearn et al. | 364/200 |
| 3,909,798 | 9/1975 | Wallach et al. | 364/200 |
| 3,938,096 | 2/1976 | Brown et al. | 364/200 |
| 4,053,948 | 10/1977 | Hogan et al. | 364/200 |
| 4,096,568 | 6/1978 | Bennett et al. | 364/200 |

*Primary Examiner*—Jerry Smith

*Attorney, Agent, or Firm*—Kirkland & Ellis

[57] ABSTRACT

The present invention discloses an apparatus for the efficient translation of virtual addresses to main storage addresses by means of a hash index table which contains main storage addresses. Hash generator apparatus is provided for generating a uniform distribution of hash index table entry addresses from a non-uniform distribution of virtual addresses in a data processing system, where the size of the hash index table is variable and is based on the size of main storage. A field of bits within the virtual address corresponding to the page identification bits are reversed in order and aligned with two groups of bits from a field of bits within the virtual address corresponding to object identification bits, and the three groups of bits are applied to an EXCLUSIVE-OR circuit. The alignment of the three groups of bits and the size of the hash index table entry addresses generated by the present invention are based on the size of the hash index table.

8 Claims, 8 Drawing Figures

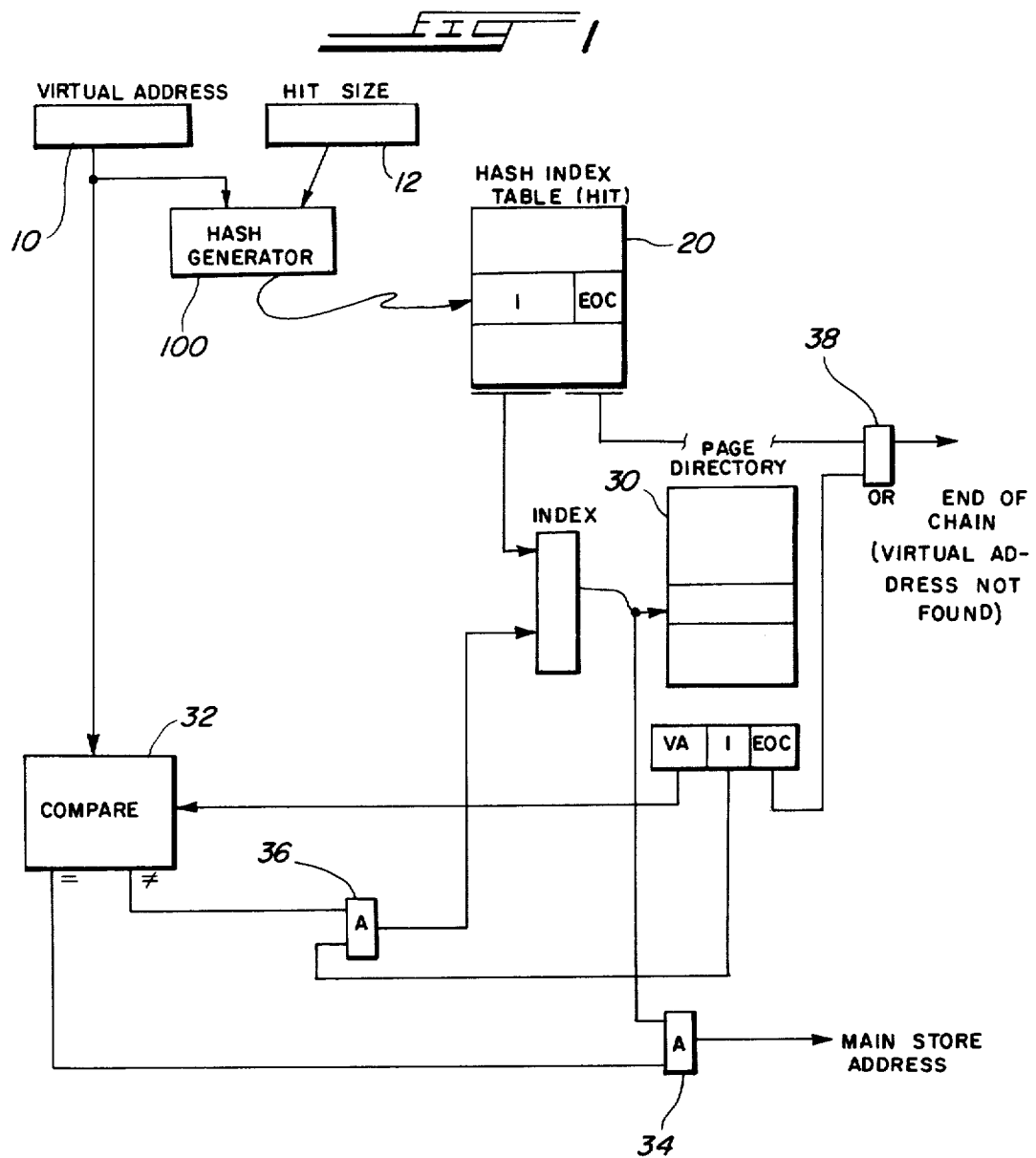
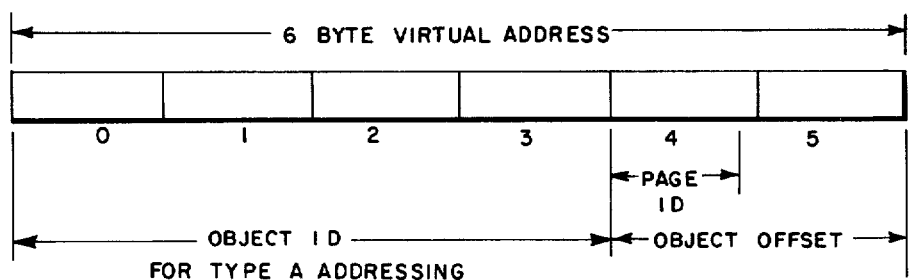

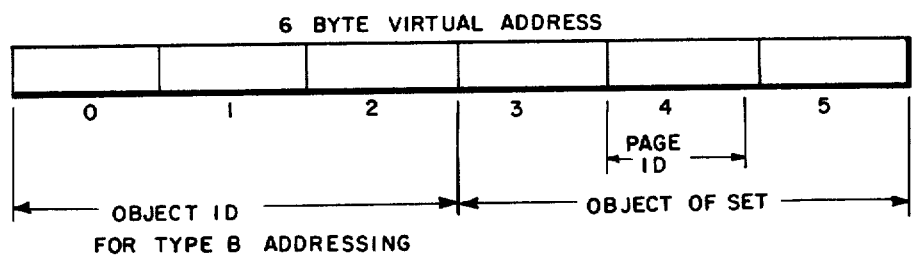
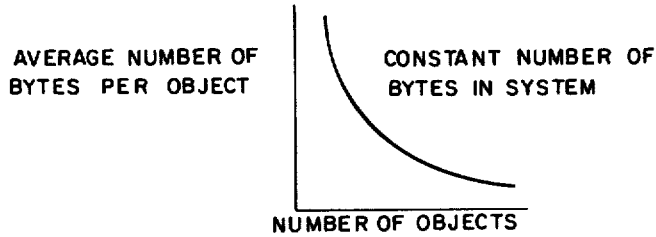
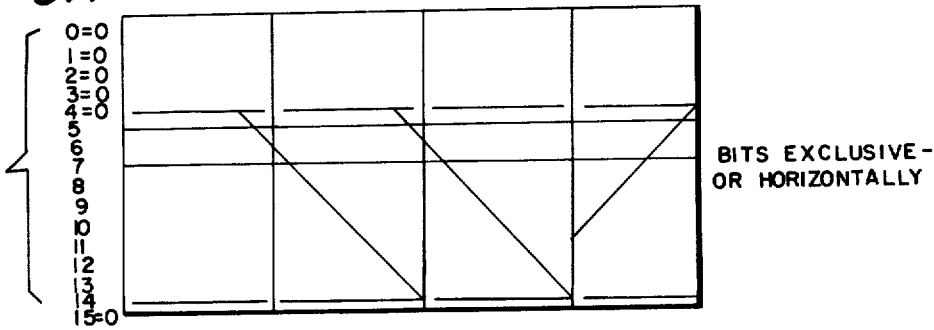
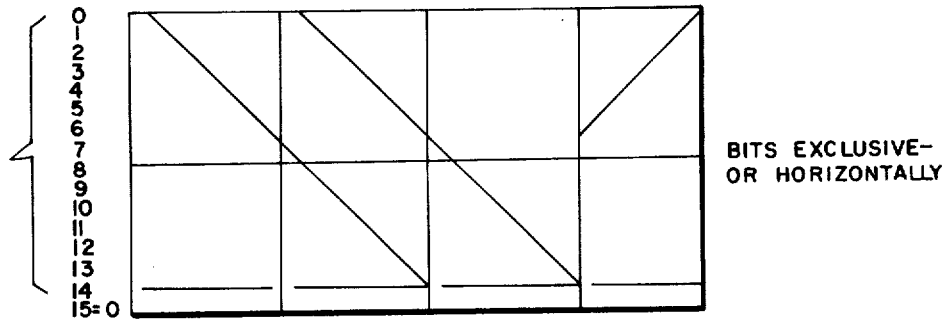
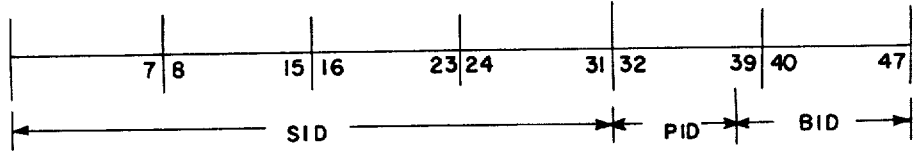

HASH INDEX TABLE HASH GENERATOR APPARATUS

DESCRIPTION

1. Technical Field

This invention relates to address translation apparatus for computer systems and, more particularly, to hash generator apparatus for generating a uniform distribution of hash index table entry addresses from a non-uniform distribution of virtual addresses where the size of the hash index table is variable and is based upon the size of main storage.

2. Background Art

In a virtual storage computer system, it is necessary to translate virtual addresses to main storage addresses which are shorter in length than the virtual addresses. This is accomplished by means of a page directory in which each entry corresponds to a page in main storage. Each entry of the page directory contains a virtual storage address and the index value for the next page directory entry in the corresponding page directory chain. Thus, if the virtual address to be translated is equal to the virtual address of the page directory entry, then the index value pointing to that entry in the page directory is equivalent to the main storage address for that virtual address. If the virtual address to be translated is not equal to the virtual address of the page directory entry, then the index value to the page directory entry is used to find the next page directory entry in that page chain. The comparisons continue until an equal comparison is made or until an end-of-chain is encountered.

One method by which a page directory can be constructed to facilitate accessing of its entries is to employ a scatter storage technique to insert entries into the page directory. Scatter storage techniques are applicable to any table or file in which access is to be made to the entries in unpredictable order and the entries are identified by some key associated with their contents. The fundamental idea behind scatter storage techniques for virtual address translation in the preferred embodiment of the present invention is that the virtual address is used to locate the main store address in a page directory. In scatter storage, some transformation is performed on the key (a virtual address in the present invention) to produce an address in a table to hold the key and the item or entry associated with the key (the main storage address in the present invention).

One such scatter storage transformation, called "hashing", involves using a "hash generator" to perform some routine operation on the key to transform it into a hash entry address. These hash entry addresses are then used to access table entries. In the present invention the virtual addresses are transformed into hash entry addresses to a hash index table which holds indicies to a page directory which further holds the virtual address associated with each index contained in the hash index table. Ideally, the transform scheme or hash coding method used by the hash generator would convert the virtual addresses to transformed hash entry addresses with no duplicates, and no unused positions would occur in the transformed table (the hash index table and the page directory in the present invention). As long as no two inserted items have the same hash entry address, searching and insertion are each performed in a single step, regardless of the size of the table. When the hash coding method results in two keys having the same hash entry address, a "collision" is said to exist. In this case the second item must be put "out of place" in the table; that is, the second item must be assigned an index value which is different from the index value contained in the associated hash index table entry. Items associated with keys having the same hash entry address must be placed in the table in a chain of table positions linked to the common hash entry address. Thus, the second and subsequent items in a page chain cannot be searched or inserted in a single step and additional time is required. Therefore, it is desirable to minimize "collisions" resulting from duplicate hash entry addresses in order to keep page chains as short as possible. The greater the number of keys having a duplicate hash entry address, the longer the chain of table positions will be, and hence the greater will be the delay that will occur during insertion and searching as the items in the chain are stored and accessed serially.

Another method by which a hash index table could be constructed would be to sort the entries; that is, the entries could be organized by their values. The best search technique for a sorted table requires at least an average of $\log_2 N$ probes to find an item, where N is the size of the table. A problem with using a sorted table is that if items need to be looked up before all of the entries are made, then either the table must be sorted after each entry is made, with the resulting heavy overhead for making each entry, or the items must be looked up in an unsorted table until all the entries are made, requiring a large number of probes to find an item. Using scatter storage techniques to construct the hash index table avoids this problem and also requires substantially fewer probes to find an entry in the hash index table. When the number of hash index table entries is equal to twice the number of pages in the main storage system, the average page chain length is equal to 1.25 entries in the page directory if the hash generator provides a uniform distribution of hash entry addresses into the hash index table.

In the prior art various types of hash generator apparatus are used to provide entry addresses which are used to access a table. For example, the key (virtual address) can be divided by some number close to the number of table entries and the remainder so obtained used as the hash entry address into the table. Another known method is to choose some bits from the middle of the square of the key, those bits to be used as the entry address to the table. Such prior art methods, however, do not provide a uniform distribution of hash entry addresses from a non-uniform distribution of keys, and therefore an excessive number of "collisions" occur. Also, it is desirable to vary the size of the hash index table to correspond with the size of the main storage memory provided for a particular computer system, and prior art hash generator apparatus require a modification of the hardware when the size of the hash index table is varied. Furthermore, prior art hash generator apparatus do not provide a uniform distribution of hash entry addresses from a non-uniform distribution of virtual addresses for a virtual address system having a variable number of objects of variable size.

DISCLOSURE OF INVENTION

The present invention provides hash generator apparatus within a virtual address translator, such hash generator apparatus producing hash entry addresses from virtual storage addresses, whereby virtual addresses are entered into a page directory by using a hash coding method on each virtual address to compute a hash entry address to an entry in a hash index table. Each entry in the hash index table contains an index into a page directory. Each entry of the page directory contains a virtual storage address and corresponds to a page in main storage. Thus, to translate a virtual storage address to a main storage address, a hash entry address to direct an entry into the hash index table is generated by the hash generator from the virtual address to be translated. The index value contained in the hash index table at the generated hash entry address is used to select a page directory entry. The virtual address contained in the page directory entry is compared to the virtual address being translated, and if they are equal, then the index value for accessing the page directory is equivalent to the main store address for that virtual address. If the virtual address to be translated is not equal to the virtual address of the page directory entry, then the index value to the page directory entry is used to find the next page directory entry in that page chain. The comparisons to succeeding entries in the page chain thus continue until an equal comparison is made or until an end-of-chain is encountered.

In a virtual storage system, objects or segments are normally addressed by assigning an object identification ("object ID") to each object and an object offset to each byte within the object. A field of bits within the object offset is assigned a page identification ("PID"). A virtual storage system can have a large number of objects of small average size, a small number of objects of large average size, or some combination in between. To provide a uniform distribution of hash entry addresses into a hash index table independent of the number and size of objects in a system, the present invention generates the hash entry addresses by reversing the bits of the PID and applying them with the low order bits of the object ID to EXCLUSIVE-OR gates. Thus, if the virtual storage system uses a large number of objects of small size, more bits from the object ID and fewer bits from the PID are effective in generating the hash index table entry addresses. Also, if the system uses a small number of objects of large size, fewer bits from the object ID and more bits from the PID are effective in generating the hash index table entry addresses. Thus, the hash generator apparatus of the present invention provides a uniform distribution of hash entry addresses from a non-uniform distribution of virtual addresses for a virtual address system having a variable number of objects of variable size.

The size of the hash index table is variable and is based on the size of main storage in each particular application, and the size of the hash index table is chosen so that the number of entries is sufficient to limit the average page chain to an acceptable length. The size of the hash index table entry addresses generated by the hash generator apparatus is determined by the size of the hash index table. The present invention provides an alignment means for aligning the reverse order PID bids with the object ID bits based upon the size of the hash index table entry address being generated before applying them to EXCLUSIVE-OR gates. Also, high order bits in the output of the present invention are set to zero based upon the size of the hash index table. Thus, no modification of the hash generator apparatus of the present invention is required when the size of the hash index table is changed.

The principal object of the present invention is to provide an improved address translation apparatus for a virtual storage computer system using a hash generator which can generate a uniform distribution of hash index table entry addresses from a non-uniform distribution of virtual addresses, and which can generate such a distribution regardless of whether the virtual storage system is comprised of a large number of objects of small size or a small number of objects of large size. It is another principal object of the invention to provide apparatus for generating a uniform distribution of hash index table entry addresses from a non-uniform distribution of virtual addresses when the size of the hash index table is variable and is dependent upon the size of main storage.

These and other objects, advantages, and features will hereinafter appear, and, for purposes of illustration, but not for limitation, exemplary embodiments of the present invention are illustrated in the accompanying drawings.

BRIEF DESCRIPTION OF DRAWINGS

FIG. 1 is a schematic diagram of a virtual address translator which incorporates the hash generator apparatus of the present invention.

FIG. 2 is a schematic diagram of the Type A virtual address structure.

FIG. 3 is a schematic diagram of the Type B virtual address structure.

FIG. 4 is a graphical representation of the relationship between the number of objects and the average number of bytes per object in a given virtual storage system.

FIG. 5, taken together with FIGS. 5A and 5B, is a schematic diagram illustrating the bits from a virtual address which participate in forming the hash in the present invention.

FIG. 5A is a graphical representation of the hash produced by the present invention when the hash index table has 1024 entries.

FIG. 5B is a graphical representation of the hash produced by the present invention when the hash index table has 32,768 entries.

BEST MODE FOR CARRYING OUT THE INVENTION

Figure 6:
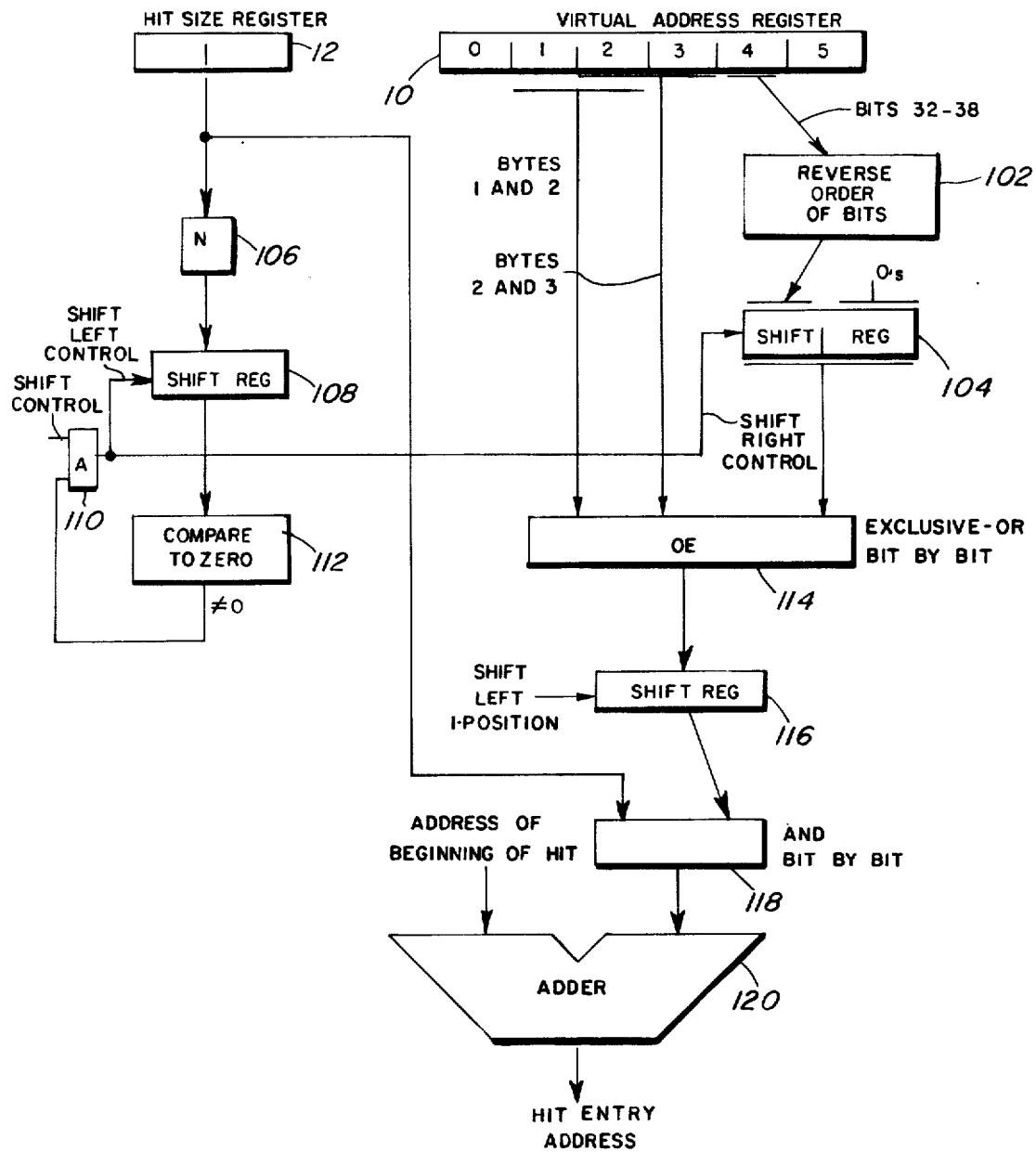
FIG. 6 is a schematic diagram of the present invention.

With reference to FIG. 1, the present invention is incorporated in a virtual address translator for translating virtual addresses to main storage addresses. The virtual address to be translated is contained in virtual address register 10. The virtual address in register 10 is hashed by hash generator 100 to provide a hash entry address into hash index table ("HIT") 20, as hereinafter described. Hash index table 20 is two bytes wide, and each entry in hash index table 20 contains an index value into page directory 30 for the first entry of the page chain associated with the virtual address being translated. Each entry in page directory 30 corresponds to a page in main storage (not shown) and contains a virtual address associated with the index to that entry. The virtual address contained in the entry in page directory 30 associated with the index value into page directory 30 obtained from hash index table 20 is then compared by compare circuit 32 with the virtual address being translated. If the virtual address in virtual address register 10 is equal to the virtual address of the entry in page directory 30, then the index value into page directory 30 is equivalent to the main storage address for that virtual address. The index value is then passed via AND circuit 34 as the main storage address corresponding to the virtual address in register 10 and the translated main storage address is thus made available to the computer system. The manner in which the main storage address is then utilized by the computer system is beyond the scope of this invention. AND circuit 34 is conditioned by a compare signal from the output of compare circuit 32.

If the virtual address to be translated is not equal to the virtual address of the entry in page directory 30 associated with the index value obtained from hash index table 20, then the index value for that page directory entry is used to find the next entry in that page chain in page directory 30. The index value in the current page directory entry is used to access the next entry in page directory 30 when AND circuit 36 is conditioned by a noncompare signal from the output of compare circuit 32 provided when the first compare fails. The virtual address associated with the new index value is then compared with the virtual address in register 10 by compare circuit 32. The operation just described repeats until an equal comparison is made between the virtual address in virtual address register 10 and a virtual address in the associated page chain in page directory 30 or until an end-of-chain is encountered. An end-of-chain entry in page directory 30 is encountered, indicating a page fault, if the comparisons of all the virtual addresses in the page chain associated with the virtual address being translated fail. Such a page fault occurs whenever the virtual address to be translated does not reside in main storage. An end-of-chain entry can also be obtained from hash index table 20 when the hash entry address generated from the virtual address to be translated does not contain an index value into page directory 30. When an end-of-chain condition is obtained either in hash index table 20 or page directory 30, a signal is produced by OR circuit 38 so that the computer system can take appropriate action to, for example, transfer the data from secondary storage into main storage. The action taken by the computer system when an end-of-chain signal is produced by OR circuit 38 is not part of this invention.

By way of illustration, two types of virtual addressing systems with which the present invention can be used are Type A object addressing, as illustrated graphically in FIG. 2, and Type B object addressing, as illustrated graphically in FIG. 3. In a virtual storage system, objects are normally assigned an object identification ("object ID") and an object offset. The virtual storage system can be partitioned into areas of storage called "segments", in which case the object ID bits could correspond to segment identification ("SID") bits. The object offset bits might correspond to both page identification ("PID") and byte identification ("BID") bits. In the Type A object addressing illustrated in FIG. 2, an object can be as large as $2^{16}$ bytes, and there can be $2^{32}$ objects in the total addressing space. Similarly, in the Type B object addressing illustrated in FIG. 3, an object can be as large as $2^{24}$ bytes, and there can be $2^{24}$ objects in the total addressing space. The relationship between the number of objects and the average number of bytes per object in a given addressing system is shown graphically in FIG. 4. Thus, FIGS. 2, 3, and 4 demonstrate that a virtual addressing system can have a large number of objects of small average size, a small number of objects of large average size, or some combination in between. As will be described below, the hash generator embodied in the present invention is independent of the number and size of objects in the system and of the amount of Type A or Type B addressing used in the system.

FIG. 6 illustrates the implementation of the present invention. The virtual address to be translated is contained in virtual address register 10. Hash generator 100 transforms the virtual address into a hash entry address to hash index table 20, as shown schematically in FIG. 1, with the size of the hash entry address corresponding to the number of entries in hash index table 20. The size of hash index table 20 is variable and is dependent upon the size of the main storage memory selected for a particular application. Thus, a larger entry address can address a greater number of entries in hash index table 20, which in turn can index a greater number of page directory entries in page directory 30. If the size of hash index table 20 was not increased as the size of the main storage memory increased, the length of the page chains in page directory 30 would have to be increased in order to contain the additional addresses to the main storage memory. It is desirable to keep the page chains as short as possible in order to minimize the time required for address translation. The operation of hash generator 100 is independent of the size of hash index table 20, as will be described in greater detail below; therefore, the number of entries in hash index table 20 can be increased when the size of main storage is increased thereby minimizing the chain lengths in page directory 30 and maximizing the translation speed.

Hash index table size register 12 is made large enough to accommodate the maximum size of hash index table 20 and provides an indicating means for indicating the number of entries in hash index table 20. Hash index table size register 12 contains a number of right-most consecutive bits set to one, with the number of such bits determined by the size of hash index table 20. The remaining left-most consecutive bits in hash index table size register 12 are set to zero. Hash index table size register 12 is utilized so that, as the size of hash index table 20 varies, the operation of hash generator 100 is unaffected, and the number of high order bits in the hash index table entry address generated by hash generator 100 that are in the zero state is varied accordingly. This is accomplished by providing a mechanism for aligning the reverse order PID bits with the object ID bits and chopping off the high order object ID bits based upon the size of the hash index table, as will be described in greater detail below.

In the embodiment illustrated in FIG. 6, the PID consists of bits 32 through 38 of byte 4 of the virtual address to be translated. The order of the bits in the PID is reversed by applying them to circuit 102. The reverse order PID bits provided by circuit 102 are then entered into bits 1 through 7 of shift-register 104. The contents of hash index table size register 12 are inverted by inverter 106 and entered into shift-register 108. The contents of shift-register 108 and the contents of shift-register 104 are then shifted left and right, respectively, until shift-register 108 contains all zeros. This is accomplished by applying the output of AND circuit 110 to the shift left control of shift-register 108 and to the shift right control of shift-register 104. AND circuit 110 is conditioned by a shift control clock signal and by the output of compare circuit 112, which provides an output signal when at least one bit contained in shift-register 108 is not equal to zero. This provides an alignment means for aligning the reverse order PID bits in shift-register 104 based upon the number of entries in hash index table 20 as indicated by the contents of hash index table size register 12.

The output of hash generator 100 is the hash index table entry address. The output is developed by reversing the PID bits, as described above, and applying those bits to an EXCLUSIVE-OR circuit with two groups of low order bits of the object ID. Thus, as illustrated in FIG. 5B taken together with FIG. 5, if the system uses a large number of objects of small size, more bits from the object ID and fewer bits from the PID are effective in generating the hash. Also, if the system uses a small number of objects of large size, as illustrated in FIG. 5A taken together with FIG. 5, fewer bits from the object ID and more bits from the PID are effective in generating the hash. This is accomplished by applying the contents of shift-register 104 to EXCLUSIVE-OR circuit 114 along with the group of bits comprised of bytes 1 and 2 and the group of bits comprised of bytes 2 and 3 of the virtual address in virtual address register 10. These three groups of bits are EXCLUSIVE-OR'ed bit-by-bit by EXCLUSIVE-OR circuit 114. The alignment of bits applied to EXCLUSIVE-OR circuit 114 is illustrated in FIG. 5A, taken together with FIG. 5, for the case where there are 1024 entries in hash index table 20 and in FIG. 5B, taken together with FIG. 5, for the case where there are 32,768 entries in hash index table 20. Thus, the alignment of the PID bits varies with the number of entries in hash index table 20, since the number of positions shift-register 104 shifts to the right is determined by the number of zeros in hash index table size register 12.

Next, the output of EXCLUSIVE-OR circuit 114 is entered into shift-register 116. The contents of shift-register 116 are then shifted left one position in order to place a zero in the right-most position of shift-register 116. This is done because each entry of hash index table 20 is two bytes wide, and entering a zero in this bit position facilitates accessing two bytes of hash index table 20 at a time in main storage (not shown) where main storage is addressed on a byte basis. The procedure by which two bytes of hash index table 20 are addressed at a time in main storage is beyond the scope of the present invention.

Finally, the contents of shift-register 116 are passed by AND circuit 118 to adder circuit 120. AND circuit 118 is conditioned bit-by-bit by the corresponding bits in hash index table size register 12 so that the left-most or higher order bits of the hash passed from shift-register 116 are set to zero. Thus, the size of the hash entry addresses generated by hash generator apparatus 100 is determined by the size of hash index table 20. Adder circuit 120 adds the hash output of AND circuit 118 to the address of the beginning of hash index table 20, and thereby provides the hash entry address into hash index table 20 for the virtual address to be translated.

Thus, the operation of hash generator 100 is made independent of the size of hash index table 20, and consequently, of the size of main storage.

While the preferred embodiment of the invention has been illustrated and described, it is to be understood that the invention is not to be limited to the precise construction herein disclosed, and the right is reserved to all changes and modifications coming within the scope of the invention as defined in the appended claims.

We claim:

1. Apparatus for generating an entry address into a table from a virtual address in a data processing system, the data processing system having a main store, the virtual address having (1) a first group of bits for addressing within an object and (2) a second group of bits for addressing a particular object, where the size of the table is variable and is dependent upon the size of the main store, the main store having a plurality of objects, comprising:

first register means for storing a virtual address;
   indicating means for indicating the number of entries in the table;
   alignment means for aligning the first group of bits relative to the second group of bits based upon the number of entries in the table as indicated by said indicating means;
   EXCLUSIVE-OR means connected to receive the first and second groups of bits after they have been aligned by said alignment means and operable to generate a result having a number of bits sufficient to represent the maximum number of entries in the table; and
   bit eliminating means for eliminating bits from the result produced by said EXCLUSIVE-OR means based upon the number of entries in the table indicated by said indicating means.

2. Apparatus for generating a hash index table entry address from a virtual address in a data processing system, the data processing system having a main store, the virtual address having a first group of bits for addressing within an object and a second group of bits for addressing a particular object, where the hash index table size is variable and is based upon the size of the main store, the main store having a plurality of objects, comprising:

a virtual address register containing a virtual address for addressing the main store;
   indicating means for indicating the number of entries in said hash index table;
   alignment means for aligning the first group of bits relative to the second group of bits based upon the number of entries in said hash index table as indicated by said indicating means;
   EXCLUSIVE-OR means for EXCLUSIVE-OR'ing the first group of bits with the second group of bits after the first and second group of bits have been aligned by said alignment means to produce a result having a number of bits encodable to represent the maximum number of entries in said hash index table; and
   bit eliminating means for eliminating bits from the result produced by said EXCLUSIVE-OR means based upon the number of entries in said hash index table indicated by said indicating means.

3. The apparatus as set forth in claim 2 further comprising:
   means for reversing the order of the first group of bits before applying that group of bits to said alignment means.

4. The apparatus as set forth in claim 2 further comprising:
   means for shifting to the left one position the result produced by said EXCLUSIVE-OR means, whereby the implementation of the hash index table in main storage which is addressed on a byte basis is facilitated.

5. The apparatus as set forth in claim 2 further comprising:

adding means for adding the main store address of the beginning of the hash index table to the result obtained from said bit eliminating means whereby the hash index table entry address is produced.

6. The apparatus as claimed in claim 2 wherein said indicating means is comprised of size register means for storing a fixed number of bits, the right-most consecutive bits being set to a first state and the left most consecutive bits being set to a second state, the number of bits in the first state corresponding to the size of the hash index table.

7. The apparatus as claimed in claim 6 wherein said alignment means comprises:
first shift register means;
second shift register means for storing the first group of bits from the virtual address;
inverting means for inverting the bits contained in said size register means;
first connecting means for connecting the output of said inverting means to said first shift register means;
compare circuit means for comparing the bits contained in said first shift register means to the second state and for providing a noncompare signal if at least one bit contained in said first shift register means is not set to the second state;
second connecting means for connecting the noncompare signal provided by said compare circuit means to said first shift register means to cause said first shift register means to shift left and to set the right-most bit in said first shift register means to the second state and for connecting the noncompare signal to said second shift register means to cause said second shift register means to shift right, said first shift register means and said second shift register means thus being shifted left and right, respectively, until all the bits in said first shift register means are in the second state.

8. Apparatus for generating a hash index table entry address from a virtual address in a data processing system, the data processing system having a main store, the virtual address having first and second groups of bits for addressing a particular segment of virtual storage and a third group of bits for addressing within a segment of virtual storage, where the size of the hash index table is variable and is based upon the size of the main store, the main store having a plurality of segments, comprising:
a virtual address register for storing a virtual address;
indicating means for indicating the size of the hash index table;
reversing means for reversing the order of the third group of bits;
alignment means for aligning the first and second groups of bits relative to the group of bits produced by said reversing means based upon the size of the hash index table as indicated by said indicating means;
EXCLUSIVE-OR means connected to receive the first and second groups of bits and the group of bits produced by said alignment means and operable to generate a result having a number of bits encodable to represent the maximum number of entries in the table;
shift left means for shifting to the left one position the result produced by said EXCLUSIVE-OR means;
bit eliminating means for eliminating high order bits from the result produced by said EXCLUSIVE-OR means and said shift left means based upon the size of the hash index table indicated by said indicating means; and
adder means for adding the main store address of the beginning of the hash index table to the result obtained from said bit eliminating means, whereby the hash index table entry address corresponding to the virtual address stored in said virtual address register is obtained.

* * * * *